US005812970A

United States Patent [19]

Chan et al.

[11] Patent Number: 5,812,970

[45] Date of Patent: Sep. 22, 1998

[54] METHOD BASED ON PITCH-STRENGTH FOR REDUCING NOISE IN PREDETERMINED SUBBANDS OF A SPEECH SIGNAL

[75] Inventors: Joseph Chan, Tokyo; Masayuki Nishiguchi, Kanagawa, both of Japan

[73] Assignee: Sony Corporation, Tokyo, Japan

[21] Appl. No.: 667,945

[22] Filed: Jun. 24, 1996

[30] Foreign Application Priority Data

Jun. 30, 1995 [JP] Japan .................................... 7-187966

[51] Int. Cl.[6] .............................. G10L 3/00; H04B 15/00

[52] U.S. Cl. .......................... 704/226; 704/227; 381/14.3

[58] Field of Search ........................... 381/94.3; 704/226, 704/227

[56] References Cited

U.S. PATENT DOCUMENTS 4,628,529 12/1986 Borth et al. ............................ 381/94.3
4,630,304 12/1986 Borth et al. ............................ 381/94.3
4,630,305 12/1986 Borth et al. ............................ 381/94.3
4,811,404 3/1989 Vilmur et al. ......................... 381/94.3
5,012,519 4/1991 Adlersberg et al. .................... 704/226
5,133,013 7/1992 Munday .................................. 704/226
5,335,312 8/1994 Mekata et al. .......................... 704/202
5,406,635 4/1995 Jarvinen ................................ 381/94.3
5,432,859 7/1995 Yang et al. ............................ 381/94.3
5,550,924 8/1996 Helf et al. .............................. 381/94.3
5,577,161 11/1996 Pelaez Ferrigno ...................... 704/226

*Primary Examiner*—David R. Hudspeth
*Assistant Examiner*—T. Smits
*Attorney, Agent, or Firm*—Jay H. Maioli

[57] ABSTRACT

A method for reducing noise in a speech signal by controlling suppression of a predetermined band when an input speech signal has a large pitch strength. The noise reduction method is to be used in an apparatus having a signal characteristic calculating unit, an adjustment calculating unit 32, a consonant component valve (CE) and relative noise level value calculating unit, a prefilter or Hn value calculating unit, and a spectrum correcting unit as main components. The signal characteristic calculating unit derives a pitch strength of the input speech signal. The adjustment calculating unit derives an adjustment value according to the pitch strength. The CE and NR value calculating unit derives an NR value according to the pitch strength. Then, the Hn value calculating unit derives the Hn value according to the NR value and sets a noise suppression rate of the input speech signal. The spectrum correcting unit 10 reduces the noise of the input speech signal based on the noise suppression rate.

8 Claims, 13 Drawing Sheets

METHOD BASED ON PITCH-STRENGTH FOR REDUCING NOISE IN PREDETERMINED SUBBANDS OF A SPEECH SIGNAL

BACKGROUND OF THE INVENTION

1. Field of the Invention

The present invention relates to a method for reducing noise in speech signals by supplying a speech signal to a speech encoding apparatus having a filter for suppressing a predetermined frequency band of a speech signal to be input to the apparatus itself.

2. Description of the Related Art

In the applied field of a portable phone or speech recognition, it has been required to suppress noises such as circumstance noise and background noise contained in a recorded speech signal, thereby enhancing voice components of the recorded speech signal.

As one technique for enhancing speech or reducing noise, the arrangement with a conditional probability function for adjusting a decay factor is disclosed in "Speech Enhancement Using a Soft-Decision Noise Suppression Filter", R. J. McAulay, M. L. Malpass, IEEE Trans. Acoust., Speech, Signal Processing, Vol.28, pp.137 to 145, April 1980 or "Frequency Domain Noise Suppression Approach in Mobile Telephone Systems", J.Yang, IEEE ICASSP, Vol.II, pp.363 to 366, April 1993, for example.

These techniques for suppressing noise, however, may generate an unnatural tone and a distorted speech because of an inappropriate fixed SNR (signal-to-noise ratio) or an inappropriate suppressing filter. In the practical use, it is not desirable for users to adjust the SNR that is one of the parameters used in a noise suppressing apparatus for maximizing the performance. Moreover, the conventional technique for enhancing a speech signal cannot fully remove noise without by-producing the distortion of the speech signals susceptible to considerable fluctuations in the short-term S/N ratio.

With the above-described speech enhancement or noise reducing method, the technique of detecting the noise domain is employed, in which the input level or power is compared to a pre-set threshold for discriminating the noise domain. However, if the time constant of the threshold value is increased for preventing tracking to the speech, it becomes impossible to follow noise level changes, especially with increases in the noise level, thus leading to mistaken discrimination.

To solve the foregoing problems, the present inventors have proposed a method for reducing noise in a speech signal in the Japanese Patent Application No. Hei 6-99869 (EP 683 482 A2).

The foregoing method for reducing the noise in a speech signal is arranged to suppress the noise by adaptively controlling a maximum likelihood filter adapted for calculating speech components based on the speech presence probability and the SN ratio calculated on the input speech signal. Specifically, the spectral difference, that is, the spectrum of an input signal less an estimated noise spectrum, is employed in calculating the probability of speech occurrence.

Further, the foregoing method for reducing the noise in a speech signal makes it possible to fully remove the noise from the input speech signal, because the maximum likelihood filter is adjusted to the most appropriate filter according to the SN ratio of the input speech signal.

However, the calculation of the probability of speech occurrence needs a complicated operation as well as an enormous amount of operations. Hence, it has been desirable to simplify the calculation.

For example, consider that the speech signal is processed by the noise reducing apparatus and then is input to the apparatus for encoding the speech signal. Since the apparatus for encoding the speech signal provides a high-pass filter or a filter for boosting a high-pass region of the signal, if the noise reducing apparatus has already suppressed the low-pass region of the filter, the apparatus for encoding the speech signal operates to further suppress the low-pass region of the signal, thereby possibly changing the frequency characteristics and reproducing an acoustically unnatural voice.

The conventional method for reducing the noise may also reproduce an acoustically unnatural voice, because the process for reducing the noise is executed not on the strength of the input speech signal such as a pitch strength but simply on the estimated noise level.

For deriving the pitch strength, a method has been known for deriving a pitch lag between the adjacent peaks of a time waveform and then an autocorrelated value in the pitch lag. This method, however, uses the autocorrelation function used in a fast Fourier transformation, which needs to compute a term of (NlogN) and further calculate a value of N. Hence, this function needs a complicated operation.

SUMMARY OF THE INVENTION

In view of the foregoing, it is an object of the present invention to provide a method for reducing noise in a speech signal which method makes it possible to simplify the operations for suppressing the noise in an input speech signal.

It is another object of the present invention to provide a method for reducing noise in a speech signal which method makes it possible to suppress a predetermined band when the input speech signal has a large pitch strength.

According to an aspect of the invention, a method for reducing noise in a speech signal for supplying a speech signal to a speech encoding apparatus having a filter for suppressing a predetermined frequency of the input speech signal, includes the step of controlling a frequency characteristic so that the noise suppression rate in the predetermined frequency band is made smaller.

The filter provided in the speech encoding apparatus is arranged to change the noise suppression rate according to the pitch strength of the input speech signal so that the noise suppression rate may be changed according to the pitch strength of the input speech signal.

The predetermined frequency band is located on the low-pass side of the speech signal. The noise suppression rate is changed so as to reduce the noise suppressing rate on the low-pass side of the input speech signal.

According to another aspect of the invention, the noise reducing method for supplying a speech signal to the speech encoding apparatus having a filter for suppressing a predetermined frequency band of the input speech signal includes the step of changing a noise suppression characteristic to a ratio of a signal level to a noise level in each frequency band when suppressing the noise according to the pitch strength of the input speech signal.

According to another aspect of the invention, a noise reducing method for supplying a speech signal to the speech encoding apparatus having a filter for suppressing a predetermined frequency band of the input voice signal includes the step of inputting each of the parameters for determining the noise suppression characteristic to a neural network for discriminating a speech domain from a noise domain of the input speech signal.

According to another aspect of the invention, a noise reducing method for supplying a speech signal to the speech encoding apparatus having a filter for suppressing a predetermined frequency band of the input speech signal includes the step of substantially linearly changing in a dB domain a maximum noise suppression rate processed on the characteristic appearing when suppressing the noise.

According to another aspect of the invention, a noise reducing method for supplying a speech signal to the speech encoding apparatus having a filter for suppressing a predetermined frequency band of the input speech signal, includes the step of obtaining a pitch strength of the input speech signal by calculating an autocorrelation nearby a pitch obtained by selecting a peak of the signal level. The characteristic used in suppressing the noise is controlled on the pitch strength.

According to another aspect of the invention, a noise reducing method for supplying a speech signal to the voice encoding apparatus having a filter for suppressing a predetermined frequency band of the input speech signal, includes the step of processing the framed speech signal independently through the effect of a frame for deriving parameters indicating the feature of the speech signal and in a frame for correcting a spectrum by using the derived parameters.

In operation, with the method for reducing the noise in a speech signal according to the invention, the speech signal is supplied to the speech encoding apparatus having a filter for suppressing the predetermined band of the input speech signal by controlling the characteristic of the filter used for reducing the noise and reducing the noise suppression rate in the predetermined frequency band of the input speech signal.

If the speech encoding apparatus has a filter for suppressing a low-pass side of the speech signal, the noise suppression rate is controlled so that the noise suppression rate is made smaller on the low-pass side of the input speech signal.

With the method for reducing the noise in a speech signal according to the present invention, a pitch of the input speech signal is detected for obtaining a strength of the detected pitch. The frequency characteristic used in suppressing the noise is controlled according to the obtained pitch strength.

With the method for reducing the noise in a speech signal according to the present invention, when each of the parameters for determining a frequency characteristic used in suppressing the noise is input to the neural network, the speech domain is discriminated from the noise domain in the input speech signal. This discrimination is made more precise with increase of the processing times.

With the method for reducing the noise in a speech signal according to the present invention, the pitch strength of the input speech signal is obtained as follows. Two peaks are selected within one period and an autocorrelated value in each peak and a cross-correlated value between the peaks are derived. The pitch strength is calculated on the autocorrelated value and the cross-correlated value. The frequency characteristic used in suppressing the noise is controlled according to the pitch strength.

With the method for reducing the noise in a speech signal according to the present invention, the framing process of the input speech signal is executed independently through the effect of a frame for correcting a spectrum and a frame for deriving a parameter indicating the feature of the speech signal. For example, the framing process for deriving the parameter takes more samples than the framing process for correcting the spectrum.

As described above, with the method for reducing the noise in a speech signal according to the present invention, the characteristic of the filter used for reducing the noise is controlled according to the pitch strength of the input speech signal. And, the predetermined frequency band of the input speech signal such as the noise suppression rate is controlled to be smaller on the high-pass side or the low-pass side. With this control, if the speech signal processed on the noise suppression rate is encoded as a speech signal, no acoustically unnatural voice may be reproduced from the speech signal. That is, the tone quality is enhanced.

DESCRIPTION OF THE PREFERRED EMBODIMENTS

Later, the description will be oriented to a method for reducing noise in a speech signal according to the present invention with reference to the drawings.

Figure 1:
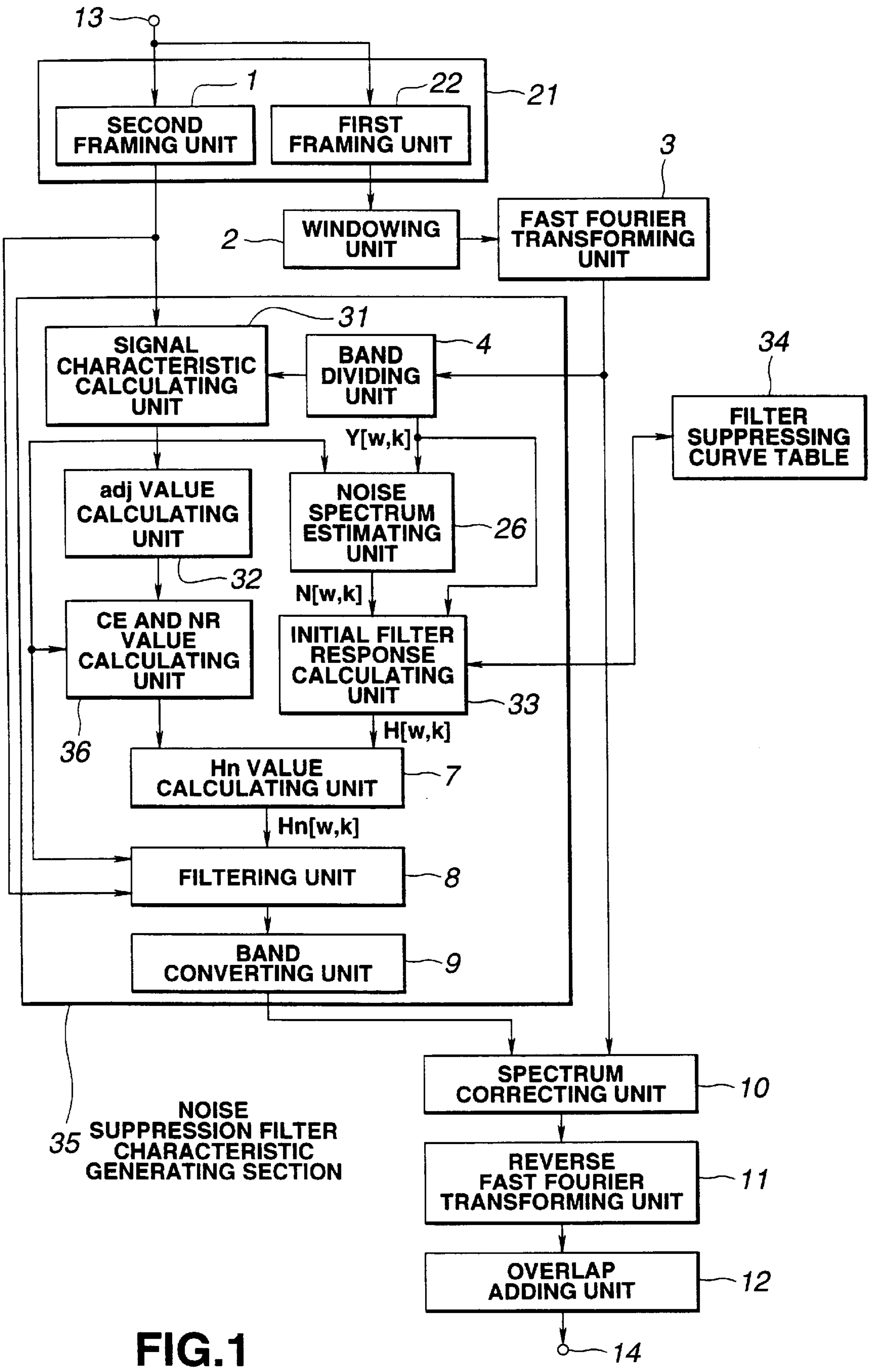
FIG. 1 is a block diagram showing an essential part of a noise reducing apparatus to which a noise reducing method in a speech signal according to the invention is applied.

FIG. 1 shows a noise reducing apparatus to which the method for reducing the noise in a speech signal according to the present invention is applied.

The noise reducing apparatus includes a noise suppression filter characteristic generating section 35 and a spectrum correcting unit 10. The generating section 35 operates to set a noise suppression rate to an input speech signal applied to an input terminal 13 for a speech signal. The spectrum correcting unit 10 operates to reduce the noise in the input speech signal based on the noise suppression rate as will be described below. The speech signal output at an output terminal 14 for the speech signal is sent to an encoding apparatus that is operated on an algorithm for encoding a predictive linear excitation.

In the noise reducing apparatus, an input speech signal y[t] containing a speech component and a noise component is supplied to the input terminal 13 for the speech signal. The input speech signal y[t] is a digital signal having a sampling frequency of FS. The signal y[t] is sent to a framing unit 21, in which the signal is divided into frames of FL samples. Later, the signal is processed in each frame.

The framing unit 21 includes a first framing portion 22 and a second framing portion 1. The first framing portion 22 operates to modify a spectrum. The second framing portion 1 operates to derive parameters indicating the feature of the speech signal. Both of the portions 22 and 1 are executed in an independent manner. The processed result of the second framing portion 1 is sent to the noise suppression filter characteristic generating section 35 as will be described below. The processed signal is used for deriving the parameters indicating the signal characteristic of the input speech signal. As will be described below, the processed result of the first framing portion 22 is sent to a spectrum correcting unit 10 for correcting the spectrum according to the noise suppression characteristic obtained on the parameter indicating the signal characteristic.

Figure 2A:
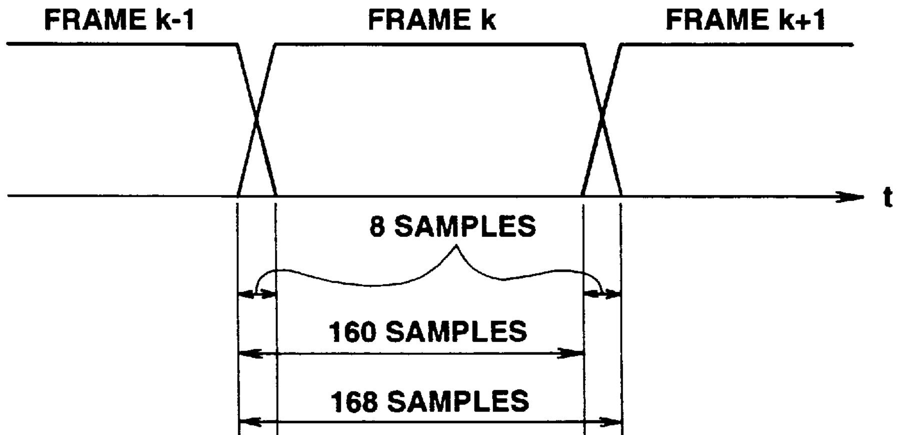
FIG. 2 is an explanatory view showing a framing process executed in a framing unit provided in the noise reducing apparatus.

As shown in FIG. 2A, the first framing portion 22 operates to divide the input speech signal into 168 samples, that is, the frame whose length FL is made up of 168 samples, pick up a k-th frame. as frame$\mathbf{1}_k$, and then output it to a windowing unit 2. Each frame frame$\mathbf{1}_k$ obtained by the first framing portion 22 is picked at a period of 160 samples. The current frame is overlapped with the previous frame by eight samples.

Figure 2B:
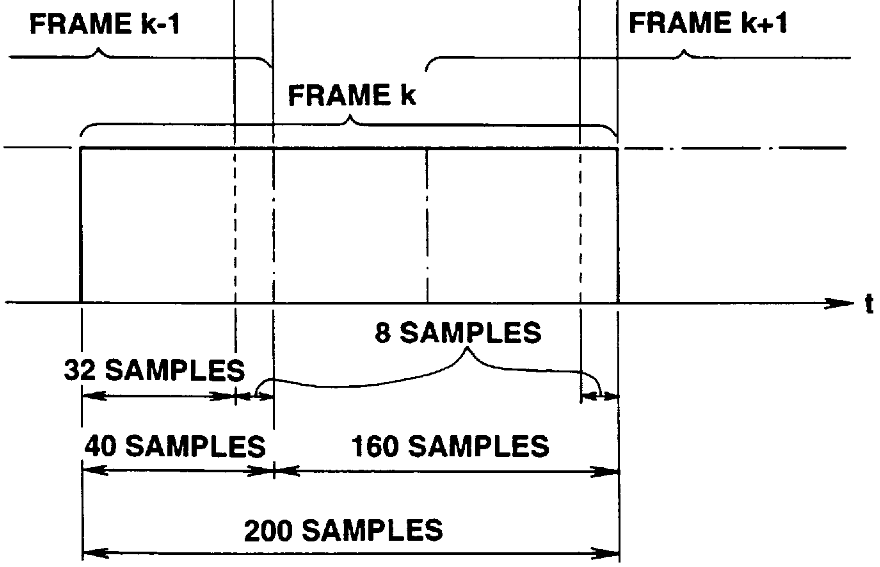

As shown in FIG. 2B, the second framing portion 1 operates to divide the input speech signal into 200 samples, that is, the frame whose length FL is made up of 200 samples, pick up a k-th frame as frame$\mathbf{2}_k$, and then output the frame to a signal characteristic calculating unit 31 and a filtering unit 8. Each frame frame$\mathbf{2}_k$ obtained by the second framing unit 1 is picked up at a period of 160 samples. The current frame is overlapped with the one previous frame frame$\mathbf{2}_{k+1}$ by 8 samples and with the one subsequent frame frame$\mathbf{2}_{k-1}$ by 40 samples.

Assuming that the sampling frequency FS is 8000 Hz, that is, 8 kHz, the framing operation is executed at regular intervals of 20 ms, because both the first framing portion 22 and the second framing portion 1 have a frame interval FI of 160 samples.

Turning to FIG. 1, prior to processing by a fast Fourier transforming unit 3 that is the next orthogonal transform, the windowing unit 2 performs the windowing operation by a windowing function $w_{input}$ with respect to each frame signal y-frame$\mathbf{1}_{j,k}$ sent from the first framing unit 22. After inverse fast Fourier transform at the final stage of signal processing of the frame-based signal, an output signal is processed by windowing by a windowing function $w_{output}$. Examples of the windowing functions $w_{input}$ and $w_{output}$ are given by the following equations (1) and (2).

$$W_{input}[j]=\left(\frac{1}{2}-\frac{1}{2}\cdot\cos\left(\frac{2\cdot\pi\cdot j}{FL}\right)\right)^{\frac{1}{4}}\quad 0\leqq j\leqq FL \tag{1}$$

$$W_{output}[j]=\left(\frac{1}{2}-\frac{1}{2}\cdot\cos\left(\frac{2\cdot\pi\cdot j}{FL}\right)\right)^{\frac{3}{4}}\quad 0\leqq j\leqq FL \tag{2}$$

Next, the fast Fourier transforming unit 3 performs the fast fourier transform at 256 points with respect to the frame-based signal y-frame$\mathbf{1}_{j,k}$ windowed by the windowing function winput to produce frequency spectral amplitude values. The resulting frequency spectral amplitude values are output to a frequency dividing unit 4 and a spectrum correcting unit 10.

The noise suppression filter characteristic generating section 35 is composed of a signal characteristic calculating unit 31, and the adj value calculating unit 32, the CE and NR value calculating unit 36, and a Hn calculating unit 7.

In the section 35, the frequency dividing unit 4 operates to divide an amplitude value of the frequency spectrum obtained by performing the fast Fourier transform with respect to the input speech signal output from the fast Fourier transforming unit 3 into e.g., 18 bands. The amplitude Y[w, k] of each band in which a band number for identifying each band is w is output to the signal characteristic calculating unit 31, a noise spectrum estimating unit 26 and an initial filter response calculating unit 33. An example of a frequency range used in dividing the frequency into bands is shown below.

TABLE 1

| Band Number | Frequency Ranges |
|---|---|
| 0 | 0–125 Hz |
| 1 | 125–250 Hz |
| 2 | 250–375 Hz |
| 3 | 375–563 Hz |
| 4 | 563–750 Hz |
| 5 | 750–938 Hz |
| 6 | 938–1125 Hz |
| 7 | 1125–1313 Hz |
| 8 | 1313–1563 Hz |
| 9 | 1563–1813 Hz |
| 10 | 1813–2063 Hz |
| 11 | 2063–2313 Hz |
| 12 | 2313–2563 Hz |
| 13 | 2563–2813 Hz |
| 14 | 2813–3063 Hz |
| 15 | 3063–3375 Hz |
| 16 | 3375–3688 Hz |
| 17 | 3688–4000 Hz |

These frequency bands are set on the basis of the fact that the perceptive resolution of the human auditory system is lowered towards the higher frequency side. As the amplitudes of the respective ranges, the maximum FFT (Fast Fourier Transform) amplitudes in the respective frequency ranges are employed.

The signal characteristic calculating unit 31 operates to calculate a RMS [k] that is a RMS value for each frame, a $dB_{rel}$ [k] that is relative energy for each frame, a MinRMS [k] that is an estimated noise level value for each frame, a MaxRMS [k] that is a maximum RMS value for each frame, and a MaxSNR [k] that is a maximum SNR value for each frame from y-frame$\mathbf{2}_{j,k}$ output from the second framing portion 1 and Y[w, k] output from the frequency dividing unit 4.

At first, the detection of the pitch and the calculation of the pitch strength will be described below.

Figure 3:
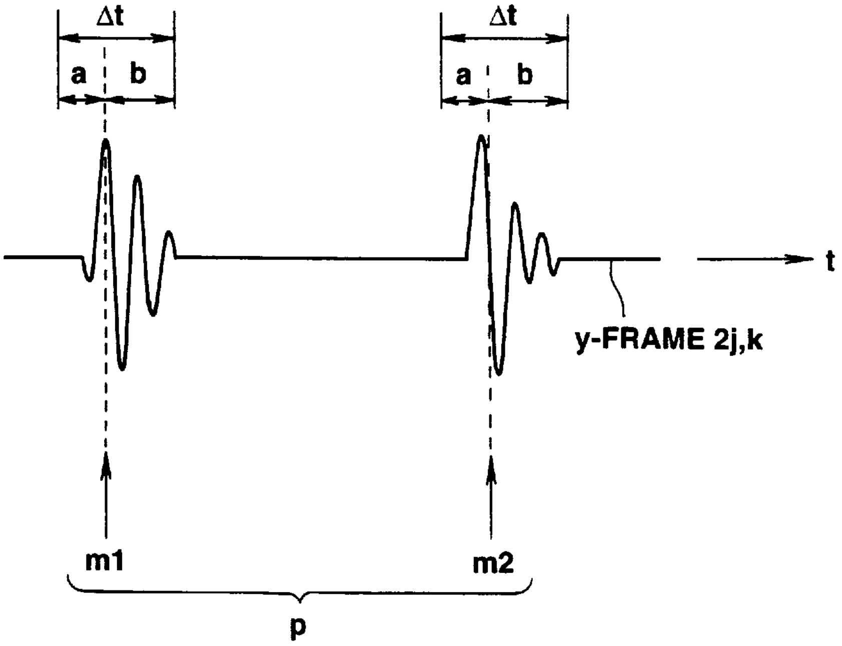
FIG. 3 is an explanatory view showing a pitch detecting process executed in a signal characteristic calculating unit provided in the noise reducing apparatus.

In detecting the pitch, as shown in FIG. 3, the strongest peak among the frames of the input speech signal y-frame$\mathbf{2}_{j,k}$ is detected as a peak x[m1]. Within the period where the peak x[m1] exists, the second strongest peak is detected as a peak x[m2]. m1 and m2 are the values of the time t for the corresponding peaks. The distance of the pitch p is obtained as a distance ¦m1 −m2¦ between the peaks x[m1] and x[m2]. As indicated in the expression (6), the maximum pitch strength max_Rxx of the pitch p can be obtained on the basis of a cross-correlating value nrg0 of the peak x[m1] with the peak x[m2] derived by the expressions (3) to (5), an autocorrelation value nrg1 of the peak x[m1], and the autocorrelation value nrg2 of the peak x[m2].

$$nrg0 = \sum_{\Delta t=-\alpha}^{b} x[m1 + \Delta t] \cdot x[m2 + \Delta t] \tag{3}$$

$$nrg1 = \sum_{\Delta t=-\alpha}^{b} x[m1 + \Delta t] \cdot x[m1 + \Delta t] \tag{4}$$

$$nrg2 = \sum_{\Delta t=-\alpha}^{b} x[m2 + \Delta t] \cdot x[m2 + \Delta t] \tag{5}$$

$$\max - Rxx = \sqrt{\frac{nrg0}{\max(nrg1,\ nrg2)}} \tag{6}$$

In succession, the method for deriving each value will be described below.

RMS[k] is a RMS value of the k-th frame frame$\mathbf{2}_k$, which is calculated by the following expression.

$$RMS[k] = \sqrt{\frac{1}{FL} \cdot \sum_{j=0}^{FL-1} (y - \text{frame}2j,\ k)^2} \tag{7}$$

The relative energy $dB_{rel}$[k] of the k-th frame frame$\mathbf{2}_k$ indicates the relative energy of the k-th frame associated with the decay energy from the previous frame frame$\mathbf{2}_{k-1}$. This relative energy $dB_{rel}$[k] in dB notation is calculated by the following expression (8). The energy value E[k] and the decay energy value $E_{decay}$[k] in the expression (8) are derived by the following expressions (9) and (10).

$$dB_{rel}[k] = 10 \cdot \log_{10}\left(\frac{E_{decay}[k]}{E[k]}\right) \tag{8}$$

$$E[k] = \sum_{t=1}^{FL} (y - \text{frame}2j,\ k)^2 \tag{9}$$

$$E_{decay}[k] = \max\left(E[k], \left(\exp\left(\frac{-FI}{0{,}65 \cdot Fs}\right)\right) \cdot E_{decay}[k-1]\right) \tag{10}$$

In the expression (10), the decay time is assumed as 0.65 second.

Figure 4:
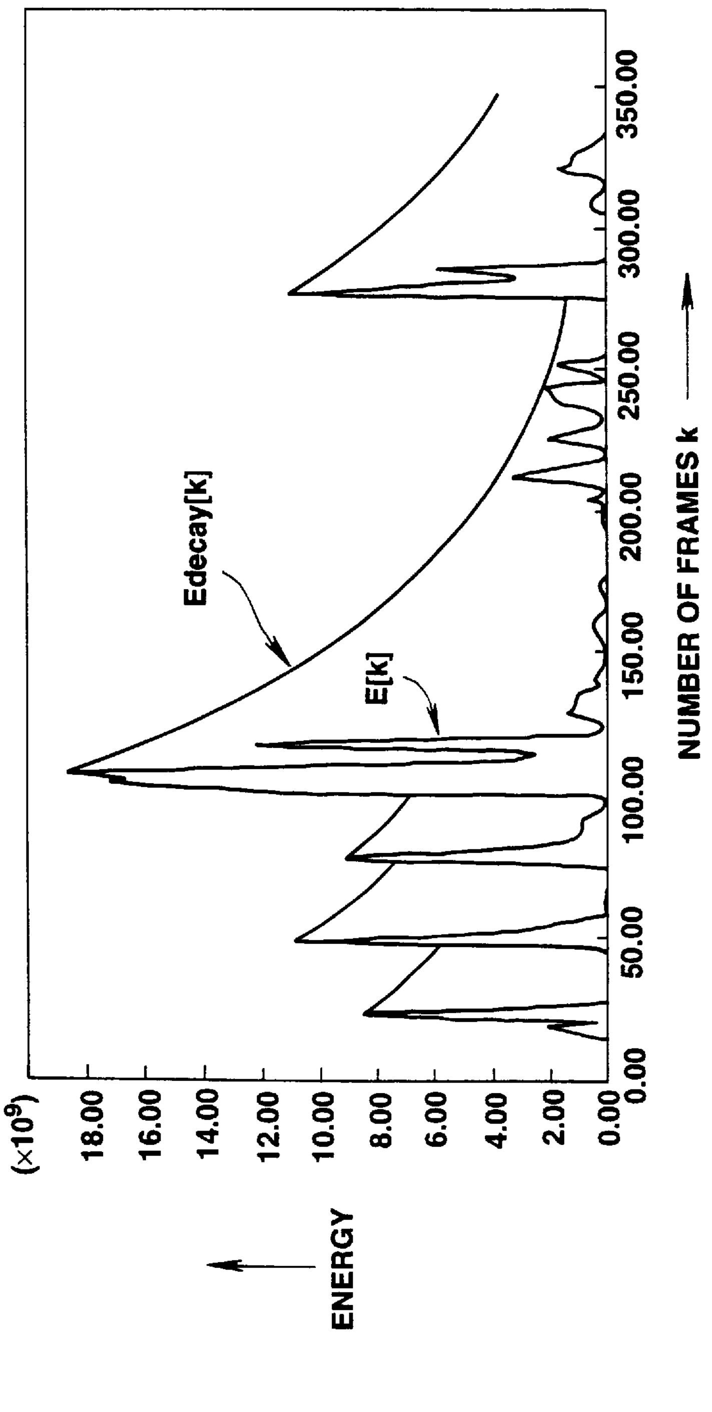
FIG. 4 is a graph showing concrete values of energy E[k] and decay energy $E_{decay}$[k] in the noise reducing apparatus.

The concrete values of the energy E[k] and the decay energy $E_{decay}$[k] will be shown in FIG. 4.

The maximum RMS value MaxRMS[k] of the k-th frame frame$\mathbf{2}_k$ is the necessary value for estimating an estimated noise level value and a maximum SN ratio of each frame to be described below. The value is calculated by the following expression (11). In the expression (11), θ is a decay constant. This constant is preferable to be a value at which the maximum RMS value is decayed by 1/e at a time of 3.2 seconds, concretely, θ=0.993769.

$$\text{MaxRMS}[k] = \max(4000, \text{RMS}[k], \theta \cdot \text{MaxRMS}[K-1] + (1-\theta) \cdot \text{RMS}[K]) \tag{11}$$

The estimated noise level value MinRMS[k] of the k-th frame frame$\mathbf{2}_k$ is a minimum RMS value that is preferable to estimating the background noise or the background noise level. This value has to be minimum among the previous five local minimums from the current point, that is, the values meeting the expression (12).

$$(\text{RMS}[k] < 0.6 \cdot \text{MaxRMS}[k] \text{RMS}[k] < 4000\ \text{RMS}[k] < \text{RMS}[k+1] \text{RMS}[k] < \text{RMS}[k-1] \text{ and } \text{RMS}[k] < \text{RMS}[k-2]) \text{ or } (\text{RMS}[k] < \text{MinRMS}) \tag{12}$$

The estimated noise level value Min RMS[k] is set so that the level value Min RMS[k] rises in the background speech-free noise. When the noise level is high, the rising rate is exponentially functional. When the noise level is low, a fixed rising rate is used for securing a larger rise.

Figure 5:
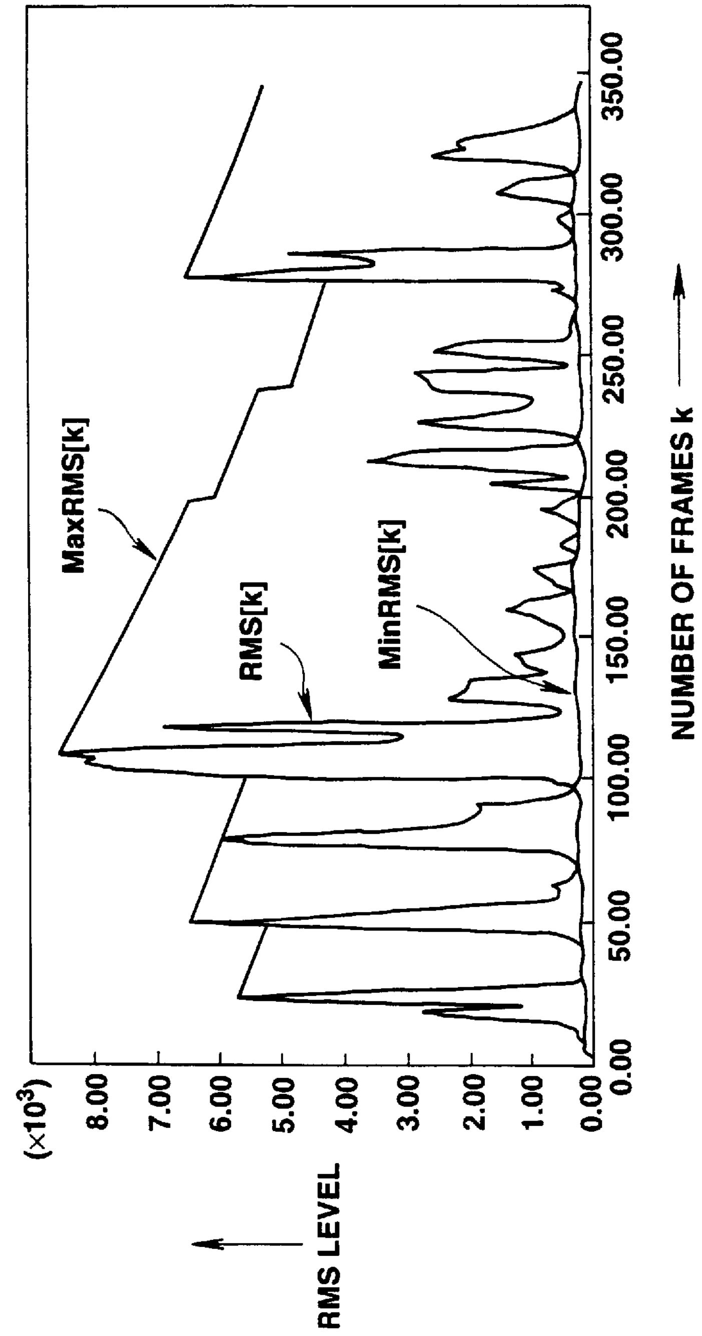
FIG. 5 is a graph showing concrete values of a RMS value RMS [k], an estimated noise level value MinRMS [k], and a maximum RMS value MaxRMS [k] used in the noise reducing apparatus.

The concrete values of the RMS value RMS[k], the estimated noise level value Min RMS[k] and the maximum RMS value Max RMS[k] will be shown in FIG. 5.

The maximum SN ratio Max SNR[k] of the k-th frame frame$\mathbf{2}_k$ is a value estimated by the following expression (13) on the Max RMS[k] and Min RMS[k].

$$\text{Max}SNR[k] = 20 \cdot \log_{10}\left(\frac{\text{Max}RMS[k]}{\text{Min}RMS[k]}\right) - 1 \tag{13}$$

Further, a normalizing parameter NR_level [k] in the range from 0 to 1 indicating the relative noise level is calculated from the maximum SN ratio value Max SNR. The NR_level [k] uses the following function.

$$NR\_\text{level}[k] = \begin{cases} \left(\frac{1}{2} + \frac{1}{2}\cos\left(\pi - \frac{\text{Max}SNR[k] - 30}{20}\right)\right) \times \\ (1 - 0.002\,(\text{Max}SNR[k] - 30)^2)\ 30 < \text{Max}SNR[k] \leqq 50 \\ 0.0\ \text{Max}SNR[k] > 50 \\ 1.0 \text{ otherwise} \end{cases} \tag{14}$$

Next, the noise spectrum estimating unit 26 operates to distinguish the speech from the background noise based on the RMS[k], $db_{rel}$[k], the NR_level[k], the MIN RMS[k] and the Max SNR[k]. That is, if the following condition is met, the signal in the k-th frame is classified as being the background noise. The amplitude value indicated by the classified background noise is calculated as a mean estimated value N[w, k] of the noise spectrum. The value N is output to the initial filter response calculating unit 33.

$$((\text{RMS}[k] < \text{NoiseRMS}_{thres}[k]) \text{ or } (dB_{rel}[k] > dB_{thres}[k])) \text{ and } (\text{RMS}[k] < \text{RMS}[k-1] + 200) \text{ Where } \text{NoiseRMS}_{thres}[k] = 1.05 + 0.45 \cdot \text{NR\_level}[k] \times \text{MinRMS}[k]\ dB_{thres_{rel}}[k] = \max(\text{MaxSNR}[k] - 4.0, 0.9 \cdot \text{MaxSNR}[k]) \tag{15}$$

Figure 6:
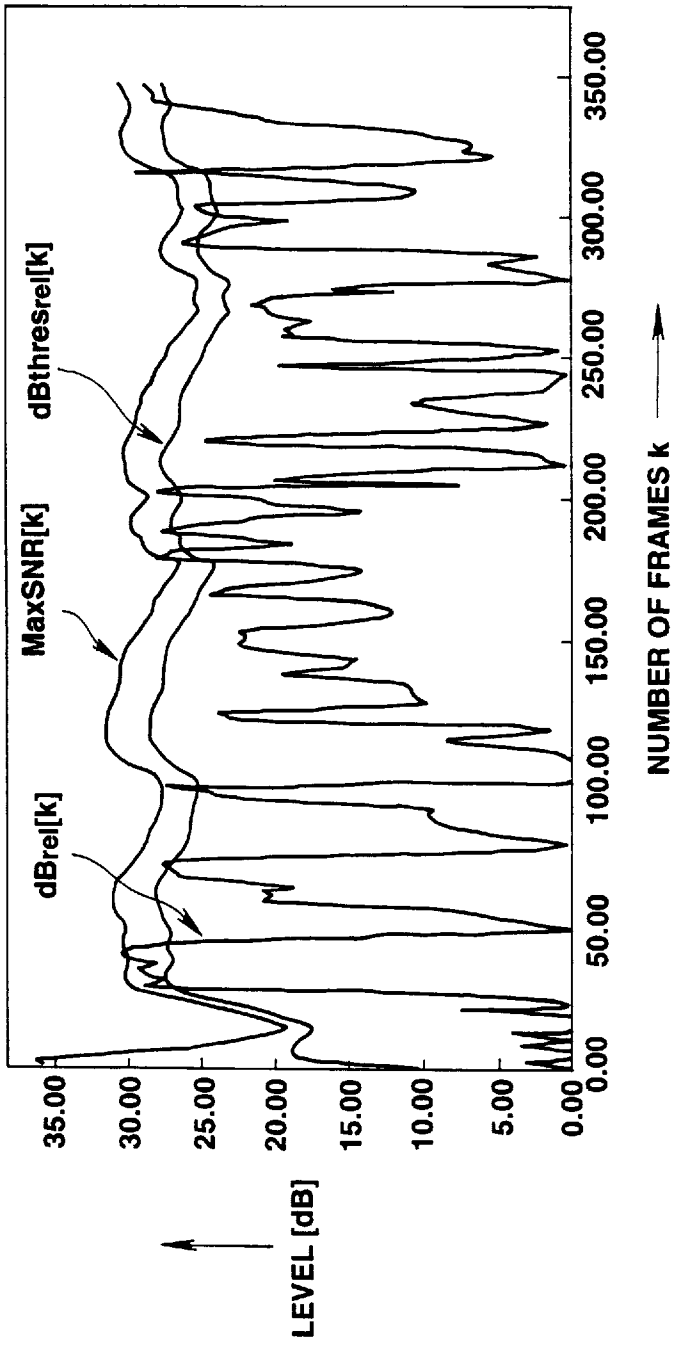
FIG. 6 is a graph showing concrete values of a relative energy $dB_{rel}$ [k], a maximum SN ratio MaxSNR [k], one threshold value $dBthres_{rel}$ [k] for determining the noise, all represented in dB, used in the noise reducing apparatus.

FIG. 6 shows the concrete values of the relative energy $dB_{rel}$[k] in dB notation found in the expression (15), the maximum SN ratio Max SNR[k], and the $\text{dBthres}_{rel}$ that is one of the threshold values for discriminating the noise.

Figure 7:
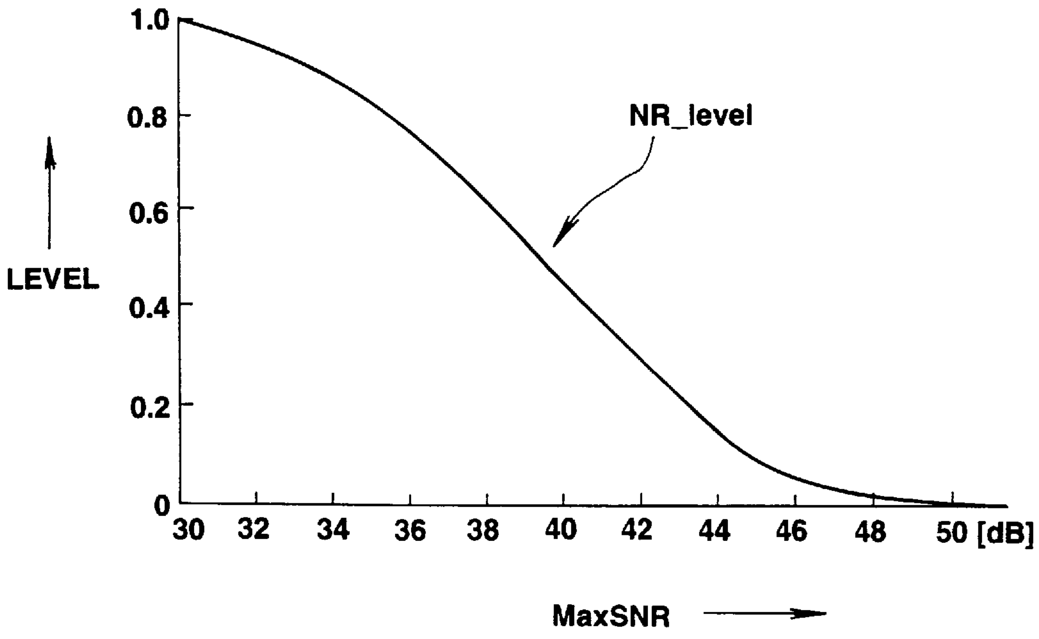
FIG. 7 is a graph showing a function of NR_level [k] defined for a maximum SN ratio MaxSNR [k] in the noise reducing apparatus.

FIG. 7 shows NR_level[k] that is a function of the Max SNR[k] found in the expression (14).

If the k-th frame is classified as being the background noise or the noise, the time mean estimated value N[w, k] of the noise spectrum is updated as shown in the following expression (16) by the amplitude Y[w, k] of the input signal spectrum of the current frame. In the value N[w, k], w denotes a band number for each of the frequency-divided bands.

$$N[w,\ k] = \alpha \cdot \max(N[w,\ k-1],\ Y[w,\ k]) + \tag{16}$$

-continued $$(1-\alpha)\cdot \min(N[w,k-1], Y[w,k])$$

$$\alpha = \exp\left(\frac{-FI}{0.5\cdot FS}\right)$$

If the k-th frame is classified as the speech, N[w, k] directly uses the value of N[w, k−1].

Next, on the RMS[k], the Min RMS[k] and the Max RMS[k], the adj value calculating unit 32 operates to calculate adj[w, k] by the expression (17) using adj1[k], adj2[k] and adj3[w, k] those of which will be described below. The adj [w, k] is output to the CE value and the NR value calculating unit 36.

$$adj[w,k]=min(adj1[k],adj2[k])-adj3[w,k] \quad (17)$$

Herein, the adj1[k] found in the expression (17) is a value that is effective in suppressing the noise suppressing operation based on the filtering operation (to be described below) in a high SN ratio over all the bands. The adj1[k] is defined in the following expression (18).

$$adj1[k] = \begin{cases} 1 & \mathrm{Max}SNR[K] < 29 \\ 1-\dfrac{\mathrm{Max}SNR[k]-29}{14} & 29 \leqq \mathrm{Max}SNR[K] < 43 \\ 0 & \text{otherwise} \end{cases} \quad (18)$$

The adj2[k] found in the expression (17) is a value that is effective in suppressing the noise suppression rate based on the above-mentioned filtering operation with respect to a quite high or low noise level. The adj1[k] is defined by the following expression (19).

$$adj2[k] = \begin{cases} 0 & \mathrm{Min}RMS[k] < 20 \\ \dfrac{\mathrm{Min}RMS[k]-20}{40} & 20 \leqq \mathrm{Min}RMS[k] < 60 \\ 1 & 60 \leqq \mathrm{Min}RMS[k] < 1000 \\ 1-\dfrac{(\mathrm{Min}RMS[k]-1000)}{1000} & 1000 \leqq \mathrm{Min}RMS[k] < 1800 \\ 0.2 & \mathrm{Min}RMS[K \geqq 1800 \end{cases} \quad (19)$$

Figure 8A:
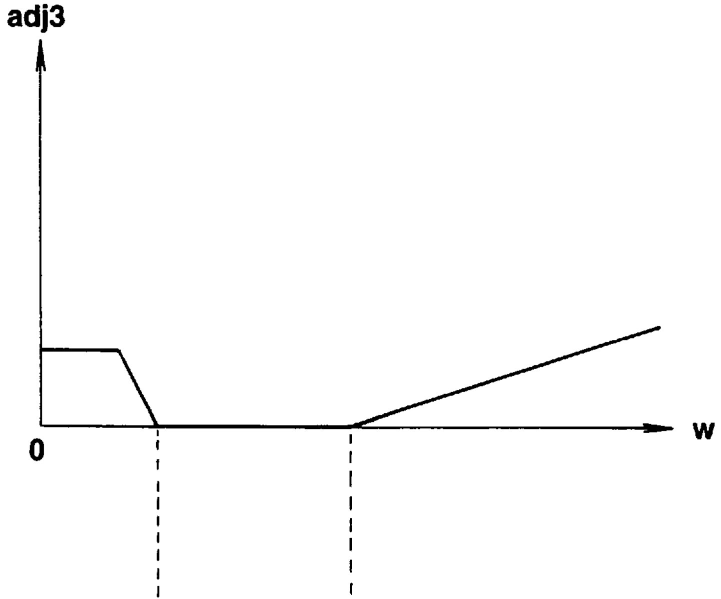
FIGS. 8A to 8B are graphs showing a relation between a value of adj3 [w, k] obtained in an adjustment value calculating unit and a frequency in the noise reducing apparatus.
Figure 8B:
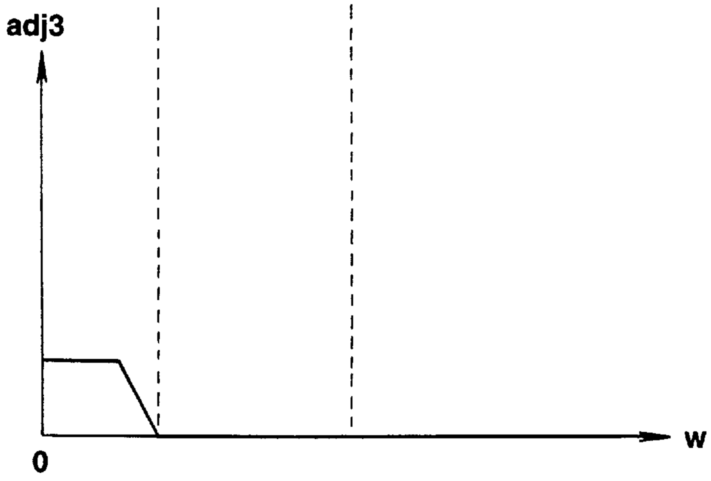

The adj3[w, k] found in the expression (17) is a value for controlling the suppressing amount of the noise on the low-pass or the high-pass side when the strength of the pitch p of the input speech signal as shown in FIG. 3, in particular, the maximum pitch strength max_Rxx is large. For example, if the pitch strength is larger than the predetermined value and the input speech signal level is larger than the noise level, the adj3[w, k] takes a predetermined value on the low-pass side as shown in FIG. 8A, changes linearly with the frequency w on the high-pass side and takes a value of 0 in the other frequency bands. In the other hand, the adj3[w, k] takes a predetermined value on the low-pass side as shown in FIG. 8B and a value of 0 in the other frequency bands.

As an example, the definition of the adj3[w, k] is indicated in the expression (20).

$$\frac{\max - Rxx[t]}{\max - Rxx[0]} > 0.55 \text{ and}$$

$$RMS[k] > 0.8\cdot \mathrm{Min}RMS[k] + 0.2\cdot \mathrm{Max}RMS[k$$

-continued $$adj3[w,k] = \begin{cases} 0.2 & w < 200\mathrm{Hz} \\ 0 & 200 \leqq w < 2375\mathrm{Hz} \\ \dfrac{0.059415(w-2375)}{4000-3275} & w \geqq 2375\mathrm{Hz} \end{cases}$$

otherwise $$adj3[w,k] = \begin{cases} 0.2 & w < 200\mathrm{Hz} \\ 0 & w \geqq 200\mathrm{Hz} \end{cases} \quad (20)$$

In the expression (20), the maximum pitch strength max_Rxx[t] is normalized by using the first maximum pitch strength max_Rxx[0]. The comparison of the input speech level with the noise level is executed by the values derived from the Min RMS[k] and the Max RMS[k].

The CE and NR value calculating unit 36 operates to obtain an NR value for controlling the filter characteristic and then output the NR value to the Hn value calculating unit 7.

For example, NR[w, k] corresponding to the NR value is defined by the following expression (21).

$$NR[w,k] = (1.0 - CE[k])\cdot NR'[w,k] \quad (21)$$

$$NR'[w,k] = \begin{cases} adj[w,k] & NR[w,k-1]-\delta_{NR} < adj[w,k] < NR[w,k-1]+\delta_{NR} \\ NR[w,k-1]-\delta_{NR} & NR[w,k-1]-\delta_{NR} \geqq adj[w,k] \\ NR[w,k-1]+\delta_{NR} & NR[w,k-1]+\delta_{NR} \leqq adj[w,k] \end{cases} \quad (22)$$

$$\delta_{NR} = 0.004$$

NR' [w, k] in the expression (21) is obtained by the expression (22) using the adj[w, k] sent from the adj value calculating unit 32.

The CE and NR value calculating unit 36 also operates to calculate CE[k] used in the expression (21). The CE[k] is a value for representing consonant components contained in the amplitude Y[w, k] of the input signal spectrum. Those consonant components are detected for each frame. The concrete detection of the consonants will be described below.

If the pitch strength is larger than the predetermined value and the input speech signal is larger than the noise level, that is, the condition indicated in the first portion of the expression (20) is met, the CE[k] takes a value of 0.5, for example. If the condition is not met, the CE[k] takes a value defined by the below-described method.

At first, a zero crossing is detected at a portion where a sign is inverted from positive to negative or vice verse between the continuous samples in the Y[w, k] or a portion where a sample having a value of 0 is located between the samples having the signs opposed to each other. The number of the zero crossings is detected at each frame. This value is used for the below-described process as a zero cross number ZC[k].

Figure 9:
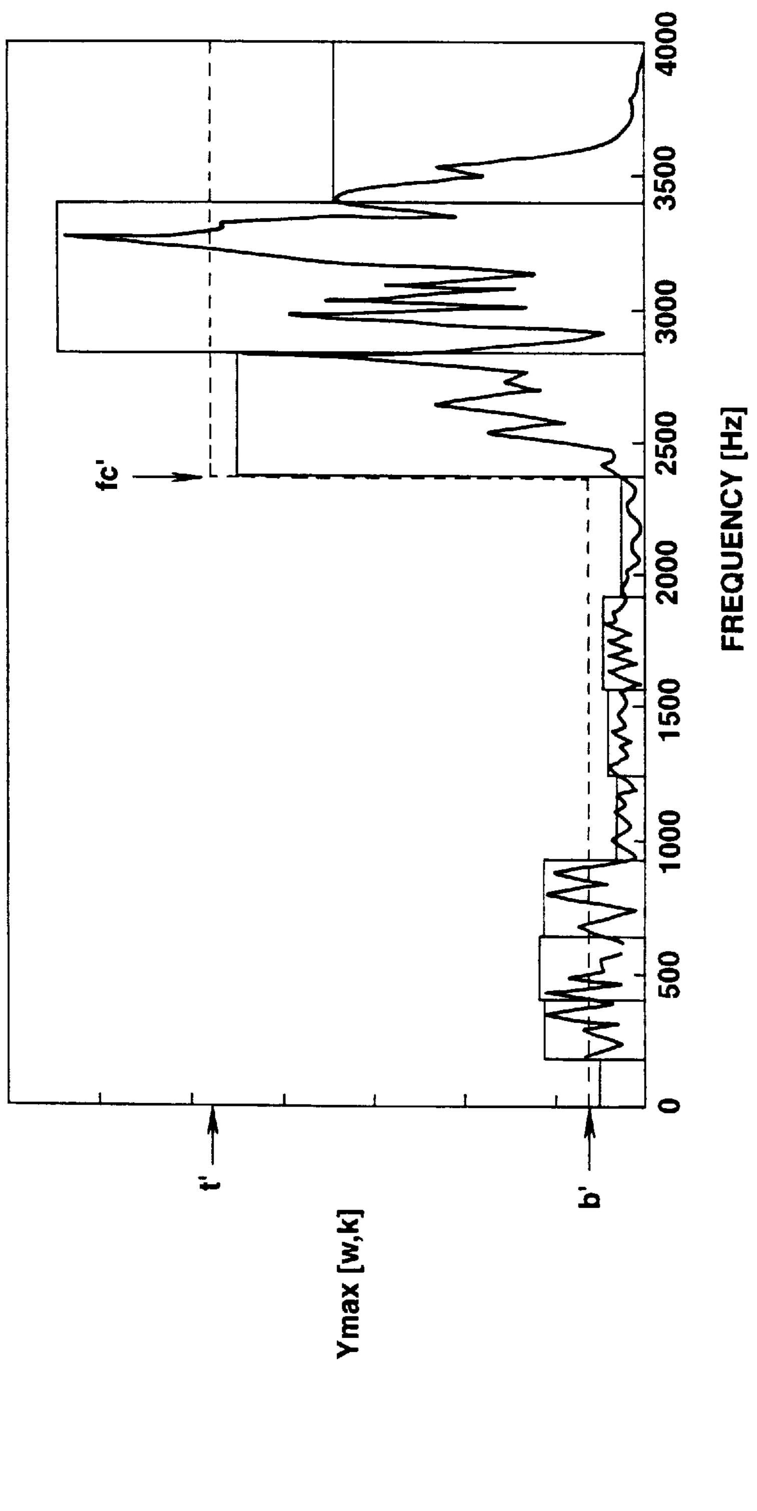
FIG. 9 is an explanatory view showing a method for obtaining a value indicating a distribution of a frequency area of an input signal spectrum in the noise reducing apparatus.

Next, a tone is detected. The tone means a value representing a distribution of frequency components of the Y[w, k], for example, a ratio of t'/b' (=tone[k]) of an average level t' of the input signal spectrum on the high-pass side to an average level b' of the input signal spectrum on the low-pass side as shown in FIG. 9. These values t' and b' are the values t and b at which an error function ERR (fc, b, t) defined in the below-described expression (23) takes a minimum value. In the expression (23), NB denotes a number of bands. $Y_{max}$ denotes a maximum value of Y[w, k] in the band w, and fc denotes a point at which the high-pass is separated from the low-pass. In FIG. 9, in the frequency fc, the average value of Y[w, k] on the low-pass side takes a value of b. The average value of Y[w, k] on the high-pass side takes a value of t.

$$\min_{\substack{fc=2\ldots NB-3\\ b,t\in R}} Err(fc,b,t) = \sum_{w=0}^{fc} (Y_{max}[w,k]-b)^2 + \sum_{w=fc+1}^{NB-1} (Y_{max}[w,k]-t)^2 \quad (23)$$

Based on the RMS value and the number of zero crosses, the frame close to the frame at which the voiced speech is detected, that is, speech proximity frame is detected. The syllable proximity frame number spch_prox[k] is obtained on the below-described expression (24) and then is output.

$$spch\_prox[k] = \begin{cases} 0 \ (RMS_i > 1250)\ (ZC_i < 70) \\ \quad \text{where } i = k-4, \ldots, k \\ spch\_prox[k-1] \text{ otherwise} \end{cases} \quad (24)$$

Based on the number of the zero crossings, the number of the speech proximity frames, the tone and the RMS value, the syllable components in the Y[w, k] of each frame are detected. As a result of detecting the syllables, CE[k] is obtained on the below-described expression (25).

$$CE[k] \begin{cases} E \ (\text{tone}[k] > 0.6)\ (C1, C2, \text{and } C3 \text{ is true}) \\ \quad \text{and}(C4.1, C4.2, \ldots, \text{or } C4.7 \text{ is true}) \\ \max\{0, CE[k-1] - 0.05\} \text{ otherwise} \end{cases} \quad (25)$$

Each of the symbols C1, C2, C3, C4.1 to C4.7 is defined on the following table.

TABLE 2

| Symbol | Definition |
|---|---|
| C1 | RMS[k] > CDSO · MinRMS[K] |
| C2 | ZC[K] > Z low |
| C3 | spch_prox[k] < T |
| C4.1 | RMS[k] > CDS1 · RMS[K−1] |
| C4.2 | RMS[k] > CDS1 · RMS[k−2] |
| C4.3 | RMS[k] > CDS1 · RMS[k−3] |
| C4.4 | ZC[k] > Z high |
| C4.5 | tone[k] > CDS2 · tone[k−1] |
| C4.6 | tone[k] > CDS2 · tone[k−2] |
| C4.7 | tone[k] > CDS2 · tone[k−3] |

In the table 2, each value of CDS0, CDS1, CDS2, T, Zlow and Zhigh is a constant for defining a sensitivity at which the syllable is detected. For example, these values are such that CDS0=CDS1=CDS2=1.41, T=20, Zlow=20, and Zhigh=75. E in the expression (25) takes a value from 0 to 1. The filter response (to be described below) is adjusted so that the syllable suppression rate is made to close to the normal rate as the value of E is closer to 0, while the syllable suppression rate is made to closer to the minimum rate as the value of E is closer to 1. As an example, the E takes a value of 0.7.

In the table 2, at a certain frame, If the symbol C1 is held, it indicates that the signal level of the frame is larger than the minimum noise level. If the symbol C2 is held, it indicates that the number of the zero crossings is larger than the predetermined number Zlow of the zero crossings, in this embodiment, 20. If the symbol C3 is held, it indicates that the current frame is located within T frames from the frame at which the voiced speed is detected, in this embodiment, within 20 frames.

If the symbol C4.1 is held, it indicates the signal level is changed in the current frame. If the symbol C4.2 is held, it indicates that the current frame is a frame whose signal level is changed one frame later than change of the speech signal. If the symbol C4.4 is held, it indicates that the number of the zero crossings is larger than the predetermined zero crossing number Zhigh, in this embodiment, 75 at the current frame. If the symbol C4.5 is held, it indicates that the tone value is changed at the frame. If the symbol C4.6 is held, it indicates that the current frame is a frame whose tone value is changed one frame later than the change of the speech signal. If the symbol C4.7 is held, it indicates that the current frame is a frame whose tone value is changed two frames later than the change of the speech signal.

In the expression (25), the conditions that the frame contains syllable components are as follows: meeting the condition of the symbols C1 to C3, keeping the tone[k] larger than 0.6 and meeting at least one of the conditions of C4.1 to C4.7.

Further, the initial filter response calculating unit 33 operates to feed the noise time mean value N[w, k] output from the noise spectrum estimating unit 26 and Y[w, k] output from the band dividing unit 4 to the filter suppressing curve table 34, find out a value of H[w, k] corresponding to Y[w, k] and N[w, k] stored in the filter suppressing curve table 34, and output the H[w, k] to the Hn value calculating unit 7. The filter suppressing curve table 34 stores the table about H[w, k]

The Hn value calculating unit 7 is a pre-filter for reducing the noise components of the amplitude Y[w, k] of the spectrum of the input signal that is divided into the bands, the time mean estimated value N[w, k] of the noise spectrum, and the NR[w, k]. In the pre-filter, the Y[w, k] is converted into the Hn[w, k] according to the N[w, k]. Then, the pre-filter outputs the filter response Hn[w, k]. The Hn[w, k] value is calculated on the below-described expression (26).

$$Hn[w,k] = \exp\{NR[w,k] \cdot \ln(H[w][S/N=r])\} \quad (26)$$

$$20 \cdot \log_{10}(H[w,k]) = NR[w,k] \cdot K \quad (27)$$

where K is constant.

The value H[w] [S/N=r] in the expression (26) corresponds to the most appropriate noise suppression filter characteristic given when the SN ratio is fixed to a certain value r. This value is tabulated according to the value of Y[w, k]/N[w, k] and is stored in the filter suppressing curve table 34. The H[w] [S/N =r] is a value changing linearly in the dB domain.

Figure 10:
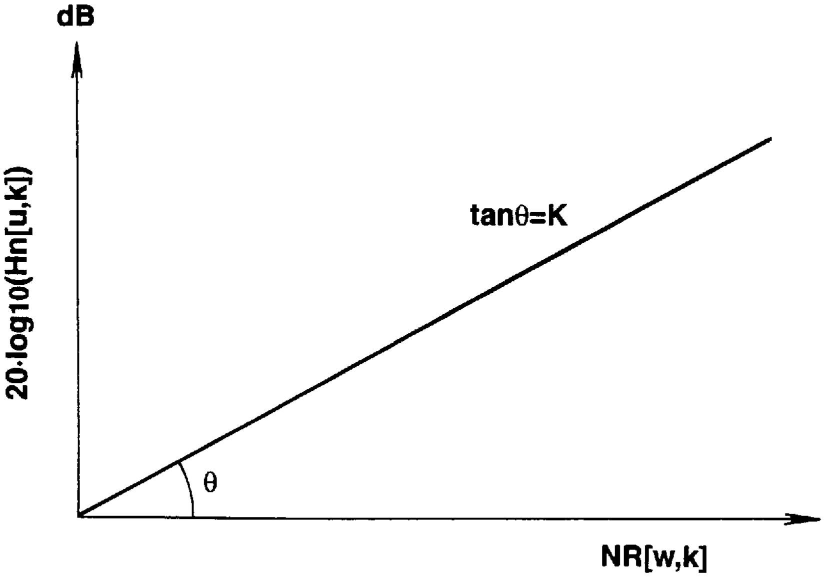
FIG. 10 is a graph showing a relation between a value of NR [w, k] obtained in a CE and NR value calculating unit and a maximum suppressing amount obtained in a Hn value calculating unit provided in the noise reducing apparatus.

The transformation of the expression (26) into the expression (27) results in indicating that the left side of the function about the maximum suppression rate has a linear relation with NR[w, k]. The relation between the function and the NR[w, k] can be indicated as shown in FIG. 10.

The filtering unit 8 operates to perform a filtering process for smoothing the Hn[w, k] value in the directions of the frequency axis and the time axis and output the smoothed signal $H_{t\_smooth}$[w, k]. The filtering process on the frequency axis is effective in reducing the effective impulse response length of the Hn[w, k]. This makes it possible to prevent occurrence of aliasing caused by circular convolution resulting from the multiplication-based filter in the frequency domain. The filtering process on the time axis is effective in limiting the changing speed of the filter for suppressing unexpected noise.

At first, the filtering process on the frequency axis will be described. The median filtering process is carried out about the Hn[w, k] of each band. The following expressions (28) and (29) indicate this method.

$$\text{step}\mathbf{1}\text{:H}\mathbf{1}[w,k]=\max\{\text{median}(Hn[w-1,k],Hn[w,k],\ H[w+1,k],Hn[w,k]\}\quad(28)$$

where H1[w,k]=Hn[w,k] in case (w−1) or (w+1) is absent.

$$\text{step}\mathbf{2}\text{:H}\mathbf{2}[w,k]=\min\{\text{median}(H1[W-1,K],H1[w,k],\ H1[w+1,\ k],H1[w,k]\}\quad(29)$$

where H2[w,k]=H1[w,k] in case (w−1) or (w+1) is absent.

At the first step (Step 1) of the expression (28), H1[w, k] is an Hn[w, k] with no unique or isolated band of 0. At the second step (step 2) of the expression (29), H2[w, k] is a H1[w, k] with no unique or isolated band. Along this relation, the Hn[w, k] is converted into the H2[w, k].

Next, the filtering process on the time axis will be described. In doing the filtering process on the time axis, it is necessary to consider that the input signal has three kinds of states, that is, a speech, a background noise, and a transient state of the leading edge of the speech. For the speech signal $H_{speech}$[w, k], as shown in the expression (30), the smoothing on the time axis is carried out.

$$H_{speach}[wk]=0.7\cdot H2[w,k]+0.3\cdot H2[w,k-1]\quad(30)$$

$$H_{noise}[w,k]=0.7\cdot Min\_H+0.3\cdot Max\_H\quad(31)$$

where

Min_H=min(H2[w,k],H2[w,k−1])

Max_H=max(H2[w,k],H2[w,k−1])

For the background noise signal, the smoothing on the time axis as shown in the following expression (31) is carried out.

For the transient state signal, the smoothing on the time axis is not carried out.

With the foregoing smoothed signal, the calculation of the expression (32) results in obtaining the smoothed output signal $H_{t\_smooth}$[w,k].

$$H_{t\_smooth}[w,k]=\quad(32)$$

$$(1-\alpha_{tr})\cdot\{\alpha_{sp}\cdot H_{Speech}[w,k]+(1-\alpha_{sp})\cdot H_{noise}[w,k]\}+\alpha_{tr}\cdot H2[w,k]$$

$$\alpha_{sp}=\begin{cases}1.0 & SNR_{inst}>4.0\\ (SNR_{inst}-1)\cdot\frac{1}{3} & 1.0<SNR_{inst}<4.0\\ 0 & \text{otherwise}\end{cases}\quad(33)$$

where $$SNR_{inst}=\frac{RMS[k]}{\text{Min}RMS[k]}$$

$$\alpha_{tr}=\begin{cases}1.0 & \delta_{rms}>3.5\\ (\delta_{rms}-2)\cdot\frac{2}{3} & 2.0<\delta_{rms}<3.5\\ 0 & \text{otherwise}\end{cases}\quad(34)$$

where $$\delta_{rms}=\frac{RMS_{local}[k]}{RMS_{local}[k-1]}$$

$$RMS_{local}[k]=\sqrt{\frac{1}{FI}\cdot\sum_{j=FI/2}^{FL-FI/2}(y-\text{frame}2j,k)^2}$$

Herein, $\alpha_{sp}$ in the expression (32) can be derived from the following expression (33) and $\alpha_{tr}$ can be derived from the following expression (34).

In succession, the band converting unit 9 operates to expand the smoothed signal $H_{t\_smooth}$[w, k] of e,g., 18 bands from the filtering unit 8 into a signal $H_{128}$[w, k] of e.g., 128 bands through the effect of the interpolation. Then, the band converting unit 9 outputs the resulting signal $H_{128}$[w, k]. This conversion is carried out at two stages, for example. The expansion from 18 bands to 64 bands is carried out by a zero degree holding process. The next expansion from 64 bands to 128 bands is carried out through a low-pass filter type interpolation.

Next, the spectrum correcting unit 10 operates to multiply the signal $H_{128}$[w, k] by a real part and an imaginary part of the FFT coefficient obtained by performing the FFT with respect to the framed signal y-frame$_{y,k}$ from the fast Fourier transforming unit 3, for modifying the spectrum, that is, reducing the noise components. Then, the spectrum correcting unit 10 outputs the resulting signal. Hence, the spectral amplitude is corrected without transformation of the phase.

Next, the reverse fast Fourier transforming unit 11 operates to perform the inverse FFT with respect to the signal obtained in the spectrum correcting unit 10 and then output the resulting IFFT signal. Then, an overlap adding unit 12 operates to overlap the frame border of the IFFT signal of one frame with that of another frame and output the resulting output speech signal at the output terminal 14 for the speech signal.

Figure 11:
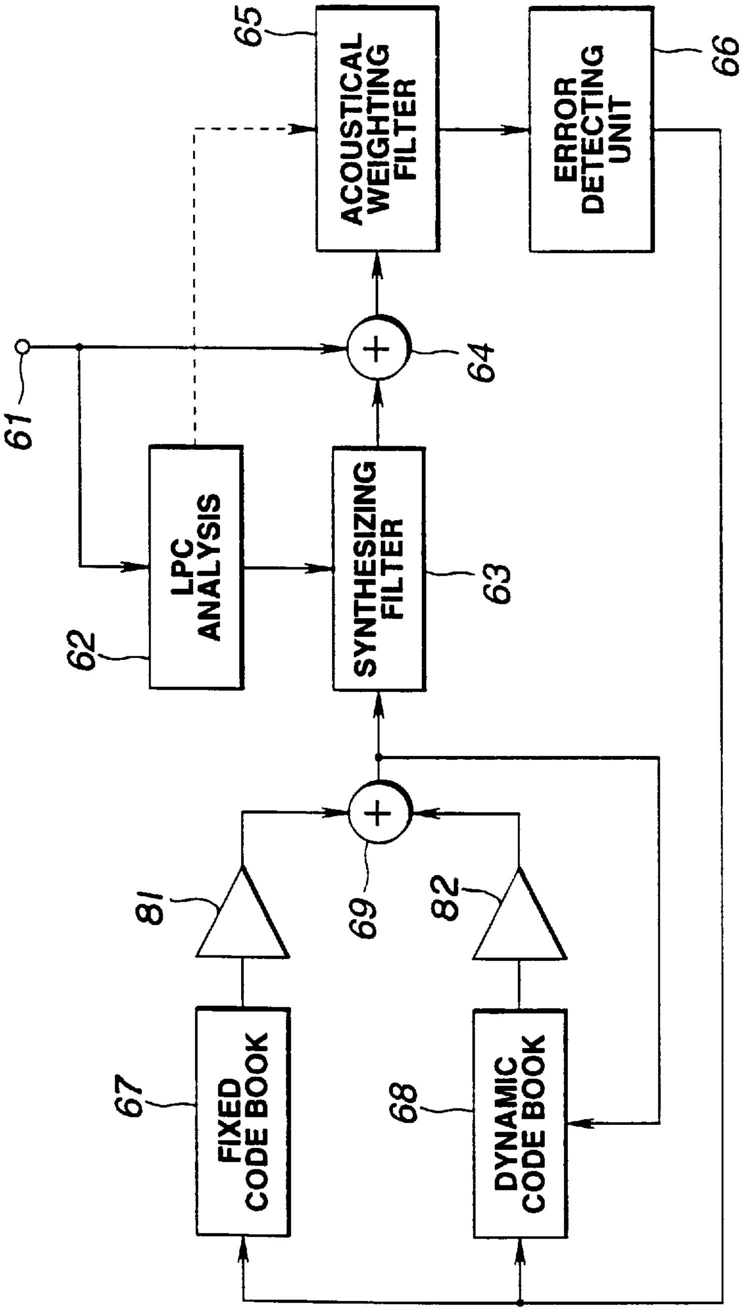
FIG.11 (PRIOR ART)
FIG. 11 is a block diagram showing an essential portion of a conventional encoding apparatus operated on an algorithm for encoding a predictive linear code excitation that is an example of using the output of the noise reducing apparatus.
Figure 12:
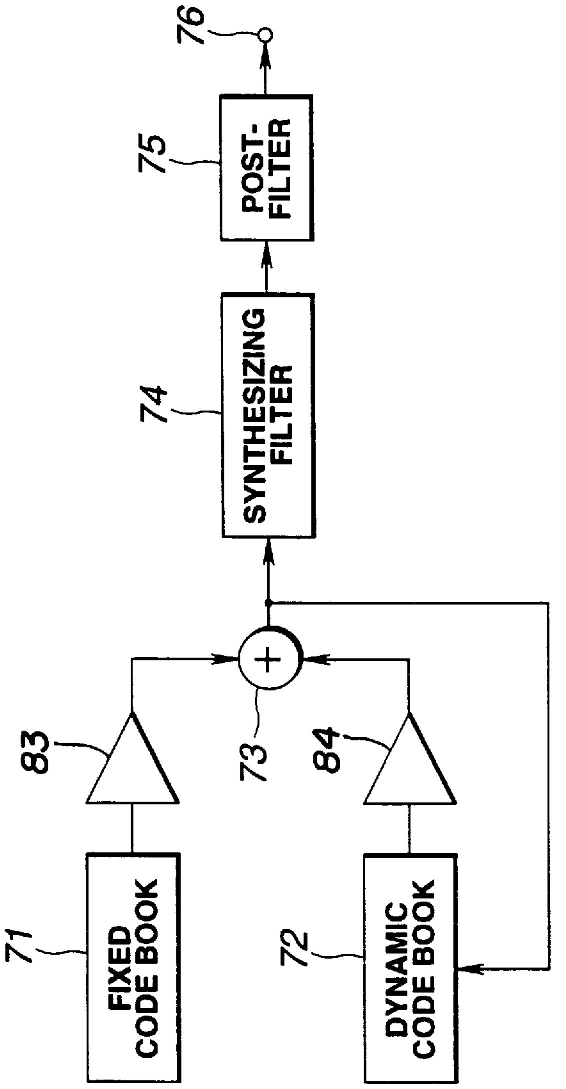
FIG.12 (PRIOR ART)
FIG. 12 is a block diagram showing an essential portion of a conventional decoding unit for decoding an encoded speech signal provided in the encoding apparatus.

Further, consider the case that this output is applied to an algorithm for linearly predicting coding excitation, for example. The conventional algorithm-based encoding apparatus is illustrated in FIG. 11. The conventional algorithm-based decoding apparatus is illustrated in FIG. 12.

As shown in FIG. 11, the encoding apparatus is arranged so that the input speech signal is applied from an input terminal 61 to a linear predictive coding (LPC) analysis unit 62 and a subtracter 64.

The LPC analysis unit 62 performs a linear prediction about the input speech signal and outputs the predictive filter coefficient to a synthesizing filter 63. Two code books, a fixed code book 67 and a dynamic code book 68, are provided. A code word from the fixed code book 67 is multiplied by a gain of a multiplier 82. Another code word from the dynamic code book 68 is multiplied by a gain of the multiplier 81. Both of the multiplied results are sent to an adder 69 in which both are added to each other. The added result is input to the LPC synthesis filter having a predictive filter coefficient. The LPC synthesis filter outputs the synthesized result to a subtracter 64.

The subtracter 64 operates to make a difference between the input speech signal and the synthesized result from the synthesizing filter 63 and then output it to an acoustical weighting filter 65. The filter 65 operates to weight the difference signal according to the spectrum of the input speech signal in each frequency band and then output the weighted signal to an error detecting unit 66. The error detecting unit 66 operates to calculate an energy of the weighted error output from the filter 65 so as to derive a code word for each of the code books so that the weighted error energy is made minimum in the search for the code books of the fixed code book 67 and the dynamic code book 68.

The encoding apparatus operates to transmit to the decoding apparatus an index of the code word of the fixed code book 67, an index of the code word of the dynamic code book 68 and an index of each gain for each of the multipliers. The LPC analysis unit 62 operates to transmit a quantizing index of each of the parameters on which the filter coefficient is generated. The decoding apparatus operates to perform a decoding process with each of these indexes.

As shown in FIG. 12, the decoding apparatus also includes a fixed code book 71 and a dynamic code book 72. The fixed code book 71 operates to take out the code word based on the index of the code word of the fixed code book 67. The dynamic code word 72 operates to take out the code word based on the index of the code word of the dynamic code word. Further, there are provided two multipliers 83 and 84, which are operated on the corresponding gain index. A numeral 74 denotes a synthesizing filter that receives some parameters such as the quantizing index from the encoding apparatus. The synthesizing filter 74 operates to synthesize the multiplied result of the code word from the two code books and the gain with an excitation signal and then output the synthesized signal to a post-filter 75. The post-filter 75 performs the so-called formant emphasis so that the valleys and the mountains of the signal are made more clear. The formant-emphasized speech signal is output from the output terminal 76.

In order to gain a more preferable speech signal in light of the acoustic sense, the algorithm contains a filtering process of suppressing the low-pass side of the encoded speech signal or booting the high-pass side thereof. The decoding apparatus feeds a decoded speech signal whose low-pass side is suppressed.

With the method for reducing the noise of the speech signal, as described above, the value of the adj3[w, k] of the adj value calculating unit 32 is estimated to have a predetermined value on the low-pass side of the speech signal having a large pitch and a linear relation with the frequency on the high-pass side of the speech signal. Hence, the suppression of the low-pass side of the speech signal is held down. This results in avoiding excessive suppression on the low-pass side of the speech signal formant-emphasized by the algorithm. It means that the encoding process may reduce the essential change of the frequency characteristic.

In the foregoing description, the noise reducing apparatus has been arranged to output the speech signal to the speech encoding apparatus that performs a filtering process of suppressing the low-pass side of the speech signal and boosting the high-pass side thereof. In place, by setting the adj3[w, k] so that the suppression of the high-pass side of the speech signal is held down when suppressing the noise, the noise reducing apparatus may be arranged to output the speech signal to the speech encoding apparatus that operates to suppress the high-pass side of the speech signal, for example.

The CE and NR value calculating unit 36 operates to change the method for calculating the CE value according to the pitch strength and define the NR value on the CE value calculated by the method. Hence, the NR value can be calculated according to the pitch strength, so that the noise suppression is made possible by using the NR value calculated according to the input speech signal. This results in reducing the spectrum quantizing error.

The Hn value calculating unit 7 operates to substantially linearly change the Hn[w, k] with respect to the NR[w, k] in the dB domain so that the contribution of the NR value to the change of the Hn value may be constantly serial. Hence, the change of the Hn value may comply with the abrupt change of the NR value.

To calculate the maximum pitch strength in the signal characteristic calculating unit 31, it is not necessary to perform a complicated operation of the autocorrelation function such as (N+logN) used in the FFT process. For example, in the case of processing 200 samples, the foregoing autocorrelation function needs 50000 processes, while the autocorrelation function according to the present invention just needs 3000 processes. This can enhance the operating speed.

As shown in FIG. 2A, the first framing unit 22 operates to sample the speech signal so that the frame length FL corresponds to 168 samples and the current frame is overlapped with the one previous frame by eight samples. As shown in FIG. 2B, the second framing unit 1 operates to sample the speech signal so that the frame length FL corresponds to 200 samples and the current frame is overlapped with the one previous frame by 40 samples and with the one subsequent frame by 8 samples. The first and the second framing units 22 and 1 are adjusted to set the starting position of each frame to the same line, and the second framing unit 1 performs the sampling operation 32 samples later than the first framing unit 22. As a result, no delay takes place between the first and the second framing units 22 and 1, so that more samples may be taken for calculating a signal characteristic value.

Figure 13:
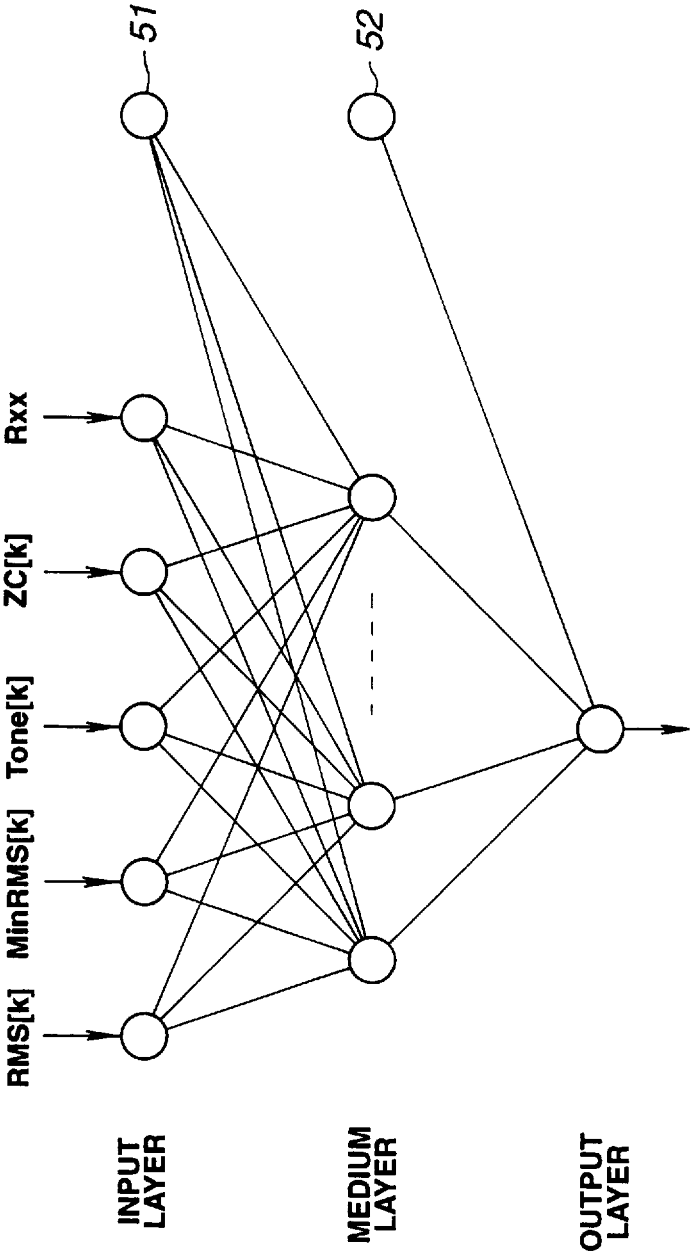
FIG. 13 is a view showing estimation of a noise domain in the method for reducing a speech signal according to an embodiment of the present invention.

The RMS[k], the Min RMS[k], the tone[w, k], the ZC[w, k] and the Rxx are used as inputs to a back-propagation type neural network for estimating noise interval, as shown in FIG. 13.

In the neural network, the RMS[k], the Min RMS[k], the tone[w, k], the ZC[w, k] and the Rxx are applied to each terminal of the input layer.

The values applied to each terminal of the input layer is output to the medium layer, when a synapse weight is added to the values.

The medium layer receives the weighted values and the bias values from a bias 51. After the predetermined process is carried out for the values, the medium layer outputs the processed result. The result is weighted.

The output layer receives the weighted result from the medium layer and the bias values from a bias 52. After the predetermined process is carried out for the values, the output layer outputs the estimated noise intervals.

The bias values output from the biases 51 and 52 and the weights added to the outputs are adaptively determined for realizing the so-called preferable transformation. Hence, as more data is processed the probability is increased. That is, as the process is repeated more, the estimated noise level and spectrum are closer to the input speech signal in the classification of the speech and the noise. This makes it possible to calculate a precise Hn value.

What is claimed is:

1. A method for reducing noise in an input speech signal by supplying the input speech signal to a speech encoding apparatus having a filter for suppressing a predetermined frequency band of the input speech signal, comprising the steps of:

controlling a frequency characteristic of the filter to reduce a noise suppression rate in the predetermined frequency band; and changing the noise suppression rate of the filter according to a pitch strength of the input speech signal.

2. The noise reduction method as claimed in claim 1, wherein the noise suppression rate is changed so that the noise suppression rate on a high-pass side of the input speech signal is de-emphasized.

3. The noise reduction method as claimed in claim 1, wherein the predetermined frequency band is located on a low-pass side of the input speech signal and the noise suppression rate of the filter is changed so that the noise suppression rate on the low-pass side of the input speech signal is de-emphasized.

4. A method for reducing noise in an input speech signal by supplying the input speech signal to a speech encoding apparatus having a filter for suppressing a predetermined frequency band of a plurality of frequency bands of the input speech signal, comprising the step of:

changing a noise suppression characteristic of the filter based on a ratio of a signal level to a noise level in each of the plurality of frequency bands while suppressing the noise in the predetermined frequency band according to a pitch strength of the input speech signal, wherein the noise suppression characteristic is changed so that a noise suppression rate is inversely proportional to the pitch strength.

5. A method for reducing noise in an input speech signal by supplying the input speech signal to a speech encoding apparatus having a filter for suppressing a predetermined frequency band of the input speech signal, comprising the steps of:

inputting parameters for determining a noise suppression characteristic to a neural network, the parameters including root mean square values, an estimated noise level of the input speech signal, and a pitch strength of the input speech signal; and distinguishing a noise interval of the input speech signal from a speech interval of the input speech signal.

6. A method for reducing noise in an input speech signal by supplying the input speech signal to a speech encoding apparatus having a filter for suppressing a predetermined frequency band of the input speech signal, comprising the steps of:

suppressing the noise in said predetermined frequency band according to a pitch strength of the input speech; and linearly changing a maximum suppression ratio of a noise suppression characteristic in a dB domain.

7. A method for reducing noise in an input speech signal by supplying the input speech signal to a speech encoding apparatus having a filter for suppressing a predetermined frequency band of the input speech signal, comprising the steps of:

deriving a pitch strength of the input speech signal by calculating an autocorrelation value close to a pitch location obtained by selecting a peak of a signal level; and controlling the noise suppression characteristic based on the pitch strength.

8. A method for reducing noise in an input speech signal by supplying the input speech signal to a speech encoding apparatus having a filter for suppressing a predetermined frequency band of the input speech signal, comprising the step of:

performing a framing process of the input speech signal by independently using a frame for calculating parameters indicating a feature of the input speech signal and using a frame for correcting a spectrum with the calculated parameters, wherein the frame for calculating parameters partially overlaps a previous frame for calculating parameters, and the frame for correcting a spectrum partially overlaps a previous frame for correcting a spectrum.

* * * * *